J. W. FAY.
PROCESS OF ELECTRIC WELDING.
APPLICATION FILED NOV. 3, 1919.
1,332,186.
Patented Feb. 24, 1920.
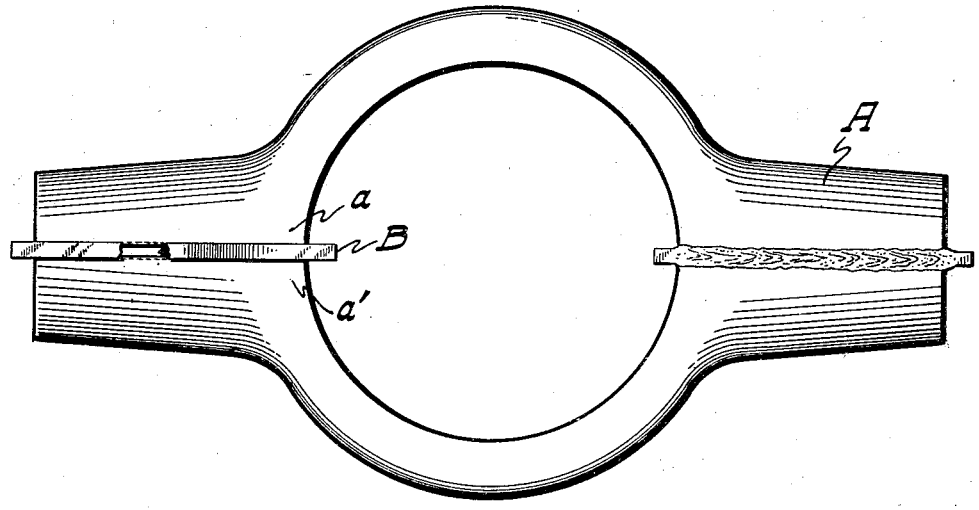
Fig. 1.
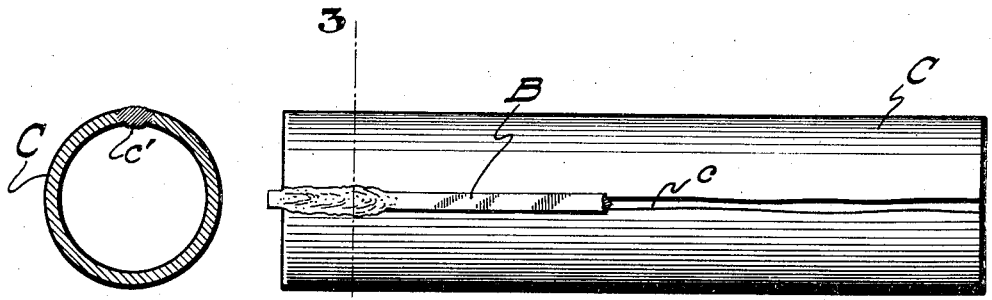
Fig. 3. Fig. 2.
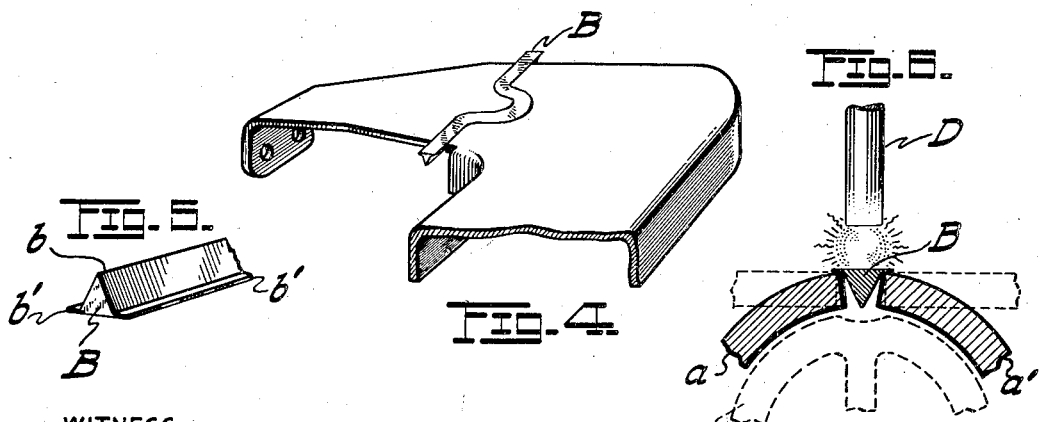
WITNESS
Phil J. Hawn
INVENTOR
Joseph W. Fay.
BY
Erwin, Wheeler & Woolard
ATTORNEYS

UNITED STATES PATENT OFFICE.

JOSEPH W. FAY, OF MILWAUKEE, WISCONSIN, ASSIGNOR TO A. O. SMITH CORPORATION, OF MILWAUKEE, WISCONSIN, A CORPORATION OF NEW YORK.

PROCESS OF ELECTRIC WELDING.

1,332,186. Specification of Letters Patent. Patented Feb. 24, 1920.

Application filed November 3, 1919. Serial No. 335,259.

*To all whom it may concern:*

Be it known that I, JOSEPH W. FAY, a citizen of the United States, and resident of the city of Milwaukee, county of Milwaukee, and State of Wisconsin, have invented a new and useful Improvement in Processes of Electric Welding; and I do declare the following to be a full, clear, and exact description thereof, such as will enable persons skilled in the art to which the invention pertains to make, use, and practice the same, reference being had to the drawing hereto attached for disclosure of certain details as to the manner of using the invention.

The invention relates to the art of electric arc welding.

The invention resides in an improved process of electric arc welding in which a fusible metallic electrode and a welding ribbon of like or similar characteristics are employed.

In practising the process of arc welding in which the work to be welded consists of a tube rolled from a plate the parallel edges of which are brought into substantially abutting contact, or of a hollow structure formed of shells with the edges in like contact, or even of two flat plates similarly arranged, it sometimes happens that by reason of irregularities in forming the parts, the sides of the open space between the abutting edges of the work to be welded are not in exact parallelism. As a consequence of this condition, the width of the open space referred to will be found to vary throughout its length, and there exists in such cases a tendency upon the part of the electric arc to burn out and enlarge the wider part of such open space, when an electric current of sufficient strength to properly fuse the work is fed through a fusible metallic electrode. But when the strength of the current is reduced so as to avoid the liability to burn out the open space as described, it has been found that such current will not properly fuse the parts at the points where the open space is closed, or nearly closed, by the near approach of the parts. This latter expedient, while preventing the destruction of the material, does not produce a weld which extends entirely through the joint, by reason of the failure of the current to bring the whole of the areas involved up to a proper welding temperature.

I attribute the burning out of the metal adjoining the open space, as above referred to, to the fact that the entire volume of intense heat generated by the arc passing from the fusible electrode, augmented by the super-heated metal flowing from such electrode, plays directly upon the exposed and separated edges of the work, which are thereby fused away instead of being merely fused to the welding point. Unless the flow of molten metal be checked, the work will show openings in which no welding action has been effected.

I have discovered that by using a welding ribbon so constructed that the edges of the work will be protected during the welding operation, an entirely satisfactory and completely welded joint may be produced, and the damage described be prevented, notwithstanding the irregularities which may exist when the meeting edges of the work to be welded are brought together. This welding ribbon is produced by swaging a drawn wire, so that the latter will have a tongue to lie in the open space formed by the slightly separated edges of the work, and extensions which will rest upon the surfaces of the work and overlap the latter in such a manner as to protect the edges thereof against the immediate action of the heat generated by the current passing through the electrode. A cooling mandrel is arranged at the under side of the joint, such mandrel collecting and cooling the fused metal and forming therefrom a rib or bead at the welding line.

In operation, the arc formed between the electrode and the work will fuse the welding ribbon before the adjacent parts have been brought to a fusing temperature, and the molten metal thus produced will flow into the open joint and be retained by the cooling mandrel. The fusible metallic electrode will be automatically fed to the work in a ratio corresponding to the consumption thereof, and the fused metal flowing from the said electrode will serve to supplement that supplied by the welding ribbon, these two sources combining to supply sufficient metal to completely fill the space at the joint, without regard to any irregularities or variations such as described which may exist.

Heretofore, the fusible electrode has been depended upon to supply the molten metal in sufficient quantity to fill the joint, but it has not always been effective to do so, by reason of the variations existing in the open space, such variations requiring greater quantities of metal at some points than at others. But the particular difficulties previously encountered have been successfully overcome by the use of my invention, and in actual practice, the consumption of the more expensive fusible electrode is materially reduced.

In the accompanying drawings,

Figure 1 is a view in elevation of an automobile rear axle housing and differential gear case formed of two parts, which are united into an integral structure, in accordance with my invention.

Fig. 2 is a plan view of a tube rolled from a metal plate, the meeting edges of which are united in accordance with my invention.

Fig. 3 is a sectional view on the line 3—3 of Fig. 2, showing the welded joint produced in such tube.

Fig. 4 is a perspective view of one end of a crossbar of an automobile frame, illustrating the application of my invention to the construction of parts having irregular meeting or joining surfaces.

Fig. 5 is a view in perspective showing a fragment of the welding ribbon employed by me, but showing such ribbon in an inverted position; and Fig. 6 is an enlarged sectional view showing the manner of applying the welding ribbon to the seam or joint of a tube, together with a portion of a mandrel which may be employed for collecting and cooling the fused metal and forming a rib or bead at the under side of the welded joint, this view also showing in dotted lines the application of the welding ribbon to the edges of two flat plates which are to be united.

In the drawings, A indicates a rear axle housing and differential gear case, for an automobile, composed of two half shell members $a$ and $a'$ which in practice are welded on opposite sides on lines parallel to the axis thereof. These half shell members are usually stamped from sheet metal plates, in a manner now well known, but may be otherwise formed if desired. In the welding operation the half shell members will be assembled and clamped in the relative positions shown, with their edges in juxtaposition, for treatment in the welding machine. In assembling the parts, the meeting edges of the two half shell members will be slightly separated so as to form a longitudinal space into which a suitable length of welding ribbon B is inserted. In the specific embodiment shown in Fig. 5, the welding ribbon is produced with two sides which converge to form a tongue or edge $b$, and also with extended or overlapping portions $b'$. The welding ribbon is produced by passing a suitable drawn wire through a pair of swaging rollers, one of which will be grooved circumferentially to impart the desired cross-sectional configuration to the tongue of the ribbon. The properties possessed by the wire will be determined by the character of the work to be welded.

The ribbon is applied to the work to be welded by inserting the tongue or edge $b$ in the opening or space between the adjacent edges of the parts with the converging or tapering sides in engagement therewith. It is not always possible to provide a space of uniform width at the welding line by reason of slight irregularities in the formation of the material, and in such instances the extensions or overlapping portions $b'$, will cover the wider spaces and will rest upon and be supported by the work. In Fig. 2 such an irregularity is shown at $c$ as existing in the tube C.

The welding machine which I use is provided with means for feeding a fusible electrode D to the work in such manner that the electrode is fused or volatilized in a direct ratio to the travel of the electrode along the welding line, or conversely, as the work moves past the point of the electrode, the electrode D through which the current is transmitted forms one terminal of the circuit, and the work to be welded forms the other.

The several parts referred to being arranged as described, an arc is struck with the tip of the electrode D. The arc thus formed fuses the electrode, as is well known. It also fuses the welding ribbon, and in a suitable degree fuses the edges of the work to be welded. The molten metal created from the electrode and the welding ribbon will be sufficient to completely fill the open space at the edges of the work, and unite the parts along the welding line to form a perfect joint. As indicated in Fig. 6, the molten metal may be collected by the cooling mandrel M, and a bead or rib $c'$, will be formed at the under side of the joint.

By the use of my invention, the fusible welding ribbon provides a reserve of metal which is sufficient, with that supplied by the fusible electrode, to entirely close the opening between the parts to be welded, and thereby reduces by a considerable amount the consumption of the fusible electrodes, which latter are expensive to produce by reason of their covering and the chemical treatment of the latter.

In the foregoing, I have described my invention as applicable to welding along straight lines. In certain classes of work the welding line follows an irregular course, as indicated in Fig. 4, in which a gusset member is shown as welded to the end of a crossbar, the latter being one of the parts of an automobile frame, it being desirable sometimes to form these parts with interlocking projections at their meeting edges. To adapt my invention to this form of welding, it is necessary only that the welding ribbon be offset laterally so as to conform to the line of the joint, and admit its ready insertion in such joint, after the manner hereinbefore described.

Having thus described my invention, what I claim and desire to secure by Letters Patent of the United States, is:

1. The process of arc welding, which consists in arranging in juxtaposition the abutting edges of the parts to be welded, placing a welding ribbon in the line of the joint, and applying an electric current by means of a fusible metallic electrode, to fuse the parts and produce a welded joint.

2. The process of arc welding, which consists in the use of a fusible metallic electrode to join the parts to be welded, supplying a welding current through such electrode, and interposing an additional supply of welding material between the fusible electrode and the parts to be welded.

3. The process of arc welding, which consists in arranging in proximity the edges of the work to be welded, placing a welding ribbon in the line of the joint, applying a welding current by means of a fusible metallic electrode to fuse the parts, and collecting the molten metal flowing from the ribbon and the electrode to form a rib or bead at the opposite side of the welded joint.

4. The method of producing electrically welded joints, which consists in placing a fusible metallic welding ribbon in the line of the joint, fusing the parts together by means of an electric current, and augmenting the fused welding ribbon by metal supplied by a fusible electrode.

In testimony whereof, I have signed my name at Milwaukee, this 24th day of October, 1919.

J. W. FAY.

Witnesses:
W. F. WOOLARD,
C. THEO. OSTERBERG.